United States Patent
Sandelman

(10) Patent No.: US 12,402,640 B2
(45) Date of Patent: *Sep. 2, 2025

(54) VAPOR PRESSURE CONTROL SYSTEM FOR DRYING AND CURING PRODUCTS

(71) Applicant: David Sandelman, Perkinsville, VT (US)

(72) Inventor: David Sandelman, Perkinsville, VT (US)

(*) Notice: Subject to any disclaimer, the term of this patent is extended or adjusted under 35 U.S.C. 154(b) by 67 days.

This patent is subject to a terminal disclaimer.

(21) Appl. No.: 17/748,109

(22) Filed: May 19, 2022

(65) Prior Publication Data

US 2022/0272993 A1 Sep. 1, 2022
US 2024/0049735 A9 Feb. 15, 2024

Related U.S. Application Data

(60) Division of application No. 16/261,075, filed on Jan. 29, 2019, now Pat. No. 11,369,119, which is a
(Continued)

(51) Int. Cl.
*A23B 4/03* (2006.01)
*A23B 4/037* (2006.01)
(Continued)

(52) U.S. Cl.
CPC .............. *A23B 4/031* (2013.01); *A23B 4/037* (2013.01); *A23B 11/604* (2025.01); *F25B 21/02* (2013.01);
(Continued)

(58) Field of Classification Search
CPC ..... A23B 4/031; A23B 4/037; A23C 19/0976; F25D 17/02; F25D 29/00;
(Continued)

(56) References Cited

U.S. PATENT DOCUMENTS 2,932,573 A   4/1960  Reiman .................... 426/248
3,905,123 A * 9/1975  Fowler ................. F26B 25/22
                                                   131/303
(Continued)

FOREIGN PATENT DOCUMENTS

EP    3745869 B1   3/2024
EP    3573466 B1   5/2024
(Continued)

OTHER PUBLICATIONS

Supplementary European Search Report in European Application No. 18745080.4.
(Continued)

*Primary Examiner* — Larry L Furdge
(74) *Attorney, Agent, or Firm* — OSTROLENK FABER LLP

(57) ABSTRACT

A system to control the conditions of an aging room, also known as a conditioned space, for products in which independent feedback loops control the dry bulb temperature and the dew point while controlling the difference between the vapor pressure in the room and the vapor pressure of the products being dried, thereby controlling the amount of and rate of water or water vapor loss of the products and, therefore controlling its quality, the system also including target controls, a thermoelectric cooler and lighting controls.

17 Claims, 10 Drawing Sheets

Related U.S. Application Data continuation-in-part of application No. 15/414,716, filed on Jan. 25, 2017, now Pat. No. 10,674,752.

(60) Provisional application No. 62/721,019, filed on Aug. 22, 2018, provisional application No. 62/662,925, filed on Apr. 26, 2018, provisional application No. 62/625,161, filed on Feb. 1, 2018.

(51) Int. Cl.
| | |
|---|---|
| *A23B 11/60* | (2025.01) |
| *F25B 21/02* | (2006.01) |
| *F25D 13/00* | (2006.01) |
| *F25D 17/02* | (2006.01) |
| *F25D 29/00* | (2006.01) |
| *F26B 19/00* | (2006.01) |
| *F26B 25/22* | (2006.01) |

(52) U.S. Cl.
CPC ............ *F25D 13/00* (2013.01); *F25D 17/02* (2013.01); *F25D 29/00* (2013.01); *F26B 19/00* (2013.01); *F26B 25/225* (2013.01); *A23V 2002/00* (2013.01); *F25D 2317/04111* (2013.01); *F25D 2700/12* (2013.01)

(58) Field of Classification Search
CPC ........ F25D 2317/04111; F25D 2700/12; F26B 19/00; F26B 25/225; F25B 21/02; A23V 2002/00
See application file for complete search history.

(56) References Cited

U.S. PATENT DOCUMENTS

| | | | | |
|---|---|---|---|---|
| 4,105,063 A * | 8/1978 | Bergt | ................ | F24F 11/88 165/230 |
| 4,704,805 A | 11/1987 | Kaya et al. | ................ | 34/31 |
| 5,299,383 A * | 4/1994 | Takakura | ................ | A01G 9/18 47/60 |
| 5,346,129 A | 9/1994 | Shah et al. | | |
| 5,675,979 A | 10/1997 | Sha | ................ | 62/176.6 |
| 5,980,962 A | 11/1999 | Bracken et al. | ................ | 426/241 |
| 6,427,454 B1 | 8/2002 | West | ................ | 62/93 |
| 6,530,160 B1 | 3/2003 | Gookins | ................ | 34/418 |
| 6,596,330 B1 * | 7/2003 | Roser Laromaine | ................ | A22C 7/0053 426/641 |
| 6,635,295 B1 | 10/2003 | Horigane | ................ | 426/384 |
| 6,640,818 B1 * | 11/2003 | Talisman | ................ | F25D 23/10 134/115 R |
| 8,445,034 B1 * | 5/2013 | Coles, Jr. | ................ | A61K 31/192 424/725 |
| 10,674,752 B2 * | 6/2020 | Sandelman | ................ | F26B 21/08 |
| 11,369,119 B2 * | 6/2022 | Sandelman | ................ | F26B 19/00 |
| 2006/0130498 A1 | 6/2006 | Joshi et al. | ................ | 62/127 |
| 2009/0211274 A1 | 8/2009 | Meng | ................ | 62/93 |
| 2009/0296342 A1 * | 12/2009 | Matteson | ................ | G06F 1/206 361/679.46 |
| 2010/0154452 A1 | 6/2010 | McCann | ................ | 62/247 |
| 2010/0310736 A1 | 12/2010 | Burke | ................ | 426/248 |
| 2011/0123698 A1 | 5/2011 | Meng | ................ | 426/418 |
| 2014/0345307 A1 * | 11/2014 | Bagley | ................ | F24F 11/30 62/115 |
| 2015/0057812 A1 * | 2/2015 | Zhao | ................ | F24F 11/30 165/11.1 |
| 2017/0074538 A1 * | 3/2017 | Marchetti | ................ | F24F 11/62 |
| 2017/0102373 A1 | 4/2017 | Atakan | | |
| 2017/0356668 A1 | 12/2017 | Goel | | |
| 2019/0133155 A1 | 5/2019 | Sandelman | | |
| 2021/0364487 A1 | 11/2021 | Zhang et al. | | |
| 2022/0090806 A1 | 3/2022 | Grefsheim et al. | | |
| 2022/0272993 A1 | 9/2022 | Sandelman | | |

FOREIGN PATENT DOCUMENTS

| | | |
|---|---|---|
| JP | S 62177608 A | 4/1987 |
| JP | 2017146052 A | 8/2017 |
| KR | 20110018695 A | 2/2011 |
| WO | WO 97/37545 A1 | 10/1997 |
| WO | WO 2012/060282 A1 | 5/2012 |
| WO | WO 2016/004528 A1 | 1/2016 |
| WO | WO 2018/140424 A1 | 8/2018 |
| WO | WO 2019/152397 A1 | 8/2019 |

OTHER PUBLICATIONS

EPO Communication dated Nov. 3, 2020 issued in European Application No. 18745080.4.
Written Opinion of the International Search Authority dated May 6, 2019 issued in corresponding International Application PCT/US2019/015640.
International Search Report dated May 6, 2019 issued in corresponding International Patent Application PCT/US2019/015640.
Hirakawa, Dyer with Cold Air, Aug. 24, 2017, JP2017146052A, Whole Document (Year: 2017).
Nakanishi, Method and Device for Control of Humidity, Aug. 4, 1987, JPS62177608A, Whole Document (Year: 1987).
Examination Report dated Jul. 6, 2023 issued in corresponding Australian Patent Application No. 2018213191.
Canadian Office Action, dated May 9, 2024, issued in corresponding Canadian Patent Application No. 3,051,367 with Examination Search Report.
International Search Report and Written Opinion, dated Jun. 12, 2024, issued in corresponding International Application No. PCT/US2024/017479.
Midwest Machinery. "How to size your HVAC system for maximum grow margin and create optimum indoor conditions for plant development" (Oct. 1, 2020) [retrieved on May 23, 2024]. URL: https://midwestmachinery.net/wp-content/uploads/2020/01/Ultimate-Grow-Room-HVAC-Guide.pdf.
Trane. "System Catalog. Indoor agriculture—A technology-based approach to growing crops indoors" (Apr. 2021) [retrieved on May 23, 2024]. Retrieved from the internet. URL: https://www.trane.com/content/dam/Trane/Commercial/global/markets/indoorag//APP-PRC008A-EN.pdf.
Extended European Search Report, dated Jul. 9, 2024, issued in corresponding European Patent Application No. 24161258,9.
Australian Examination Report No. 1, dated Mar. 17, 2023, issued in corresponding Australian Patent Application No. 2018213191.

* cited by examiner

VAPOR PRESSURE CONTROL SYSTEM FOR DRYING AND CURING PRODUCTS

RELATED APPLICATION

The present application is a divisional under 37 C.F.R. § 1.53(b) of prior application Ser. No. 16/261,075, filed Jan. 29, 2019, currently pending and also whose disclosure is incorporated herein, and which also claims priority to and incorporates the contents of U.S. provisional patent application Ser. Nos. 62/721,019, filed Aug. 22, 2018, 62/662,925, filed Apr. 26, 2018, 62/625,161, filed Feb. 1, 2018, and U.S. patent application Ser. No. 15/414,716, filed Jan. 25, 2017.

BACKGROUND OF THE INVENTION

Various products require time for what is called either "aging" or "drying". Cheeses and meats have historically been aged in caves. Cannabis has historically been cried using simple home grown drying techniques. The local climate, geological conditions and season, dictated the temperature and humidity in the caves for foods. Due to these varied conditions, different styles and types of food products come from different locations. People are now making aged cheeses and meats of all different types, and in all locations around the world. The challenge they face is controlling/creating the proper conditions in the rooms where the product is being dried or aged. At present most facilities try to control the temperature in the room (dry bulb) and humidity (% RH) with limited success. % Relative Humidity is calculated using the Partial Vapor Pressure ($e_w$)/Saturated Vapor Pressure ($e^*_w$)*100. The Partial Vapor Pressure changes with the Dew Point. The Saturated vapor pressure changes with the dry bulb temperature. Conventional prior art techniques for drying and curing Cannabis leaves have largely used more elementary home grown methods. Some larger facilities for drying Cannabis use the above described facilities to try to control the temperature and humidity in a controlled space.

The term product is used to describe food products as well as Cannabis plant leaves and other similar products.

Vapor pressure in a room is used interchangeably with dew point but vapor pressure of a food or a plant is specific to that product and is subject to measurement. In this patent application, vapor pressure in a room and dew point of the room are used interchangeably, but dew point is never used as the same as vapor pressure of a food or plant since the term dew point is not used in those instances.

The drying and curing of products such as meats, cheeses and Cannabis leaves as well as similar products essentially involves removing water from the products. The amount and rate of removal substantially controls the quality and desirability of the products. This invention improves the control and effective manipulation of such rate and removal of water to provide for better and more valuable products after they are dried and cured as compared to current and past processes for drying and curing.

SUMMARY OF THE INVENTION

This invention provides an improved automated control system for drying and curing Cannabis flowers which enhances the product and otherwise materially improves the process and resulting product. The improved control systems also can be used for aging foods such as cheeses and meats.

Trying to control the % RH in a room with a single point control system such as a Humidity control, will only work if the temperature of the room is held at a constant temperature. A more effective control requires two control loops, the $1^{st}$ control loop controls the dry bulb temperature in the room, and the $2^{nd}$ control loop controls the Vapor Pressure in the room. The Vapor Pressure in the room can also be expressed as Dew Point, which can be derived from the Wet Bulb Temperature in the room. In fact, a Dew Point sensor is the commonly used device to determine the dew point and/or the vapor pressure. The preferred unit of measurement for the second control loop is Dew Point, but not limited to, since Dew Point can be measured as a primary type measurement with a chilled mirror.

In the aging/drying process of food products, water is released from the product in the form of water vapor. Each specific food product has its own vapor pressure and a known value. The product's ability to lose water can be measured by determining the products partial vapor pressure. This is expressed as Water Activity or $a_w$. By controlling the partial vapor pressure in the room as compared to the partial vapor pressure of the product being aged, you can control the rate at which the product loses moisture.

Food products are typically made up primarily of water and sold by weight, so the control of moisture loss from the product can have a significant impact on profitability. If the product loses more water than desired, the final product will weigh less than the optimum final weight and thereby reduce the selling price.

The rate at which cured meats lose moisture is also important, since the drying process requires the loss of free water from within the product. If the available water leaves the product too quickly, which can be caused by the vapor pressure in the drying room being too low as compared to the product's vapor pressure then this rapid loss of moisture will cause the outer layer of the product to be too dry and reduce the rate at which the moisture can leave the center of the product, trapping moisture in the core of the product. This is an undesirable outcome when aging/drying product. So a proper balance of the product vapor pressure and room vapor pressure is important. Controlling the difference will control the rate at which the product loses moisture.

In aging and drying rooms the vapor pressure is typically reduced with the use of a coil that has a surface temperature that is below the dew point of the air in the room. Since this surface is below the dew point, condensation forms removing water vapor from the air in the room, which reduces the vapor pressure in the room.

At present, aging and drying rooms, typically use a simple on/off humidistat, or an on/off dry bulb thermostat to control the operation of the cooling coil. Depending on the configuration one may also introduce additional humidity or heat if required. This control configuration leads to swings of the dew point in the room as the cooling coil cycles on and off, and also wastes energy while simultaneously cooling and heating the air, commonly known as 'reheat' in the HVAC industry. One may also add moisture to the air with a humidifier, while simultaneously removing the moisture with the cooling coil, this is also an imprecise and wasteful practice.

Prior Art Systems for Food Processing

Typical HVAC System control of Temperature and Humidity
On/Off Thermostat Controls Dry Bulb Temperature
Humidstat Adds Moisture to Air
Thermostat (DX or on/Off Cooling) and Humidstat as Separate Control Loops.

High dry bulb temperature causes the thermostat to call for cooling, and activates the DX (direct expansion) cooling system. The cooling coil will cool to the predetermined temperature based on suction pressure of the compressor, which is typically 25 F to 32 F. The cooling system will run until the dry bulb temperature is pulled down to a point that satisfies the dry bulb thermostat.

During the cooling period, water in the air will be removed as a function of the coil temperature as long as the air's dew point is above the coil temperature. The thermostat only controls the dry bulb temperature with no regard to the vapor pressure (dew point) in the space.

A condition of low relative humidity in the space will cause the humidstat to activate a humidifier to add moisture into the space. The amount of water that is added is a function the relative humidity and not the absolute amount of water. As the dry bulb air temperature moves up and down within the controlling range of the dry bulb thermostat, the relative humidity in the space will fluctuate based on the dry bulb temperature, causing the humidstat to chase the fluctuating relative humidity caused by the fluctuating dry bulb temperature.

Existing HVAC system controls are inherently unstable in maintaining constant vapor pressure, a critical factor in aging, curing and drying products. The instability is caused by the interaction of the dry bulb affecting the relative humidity. When the dry bulb thermostat calls for cooling, the cooling coil's temperature drops from the ambient temperature to somewhere near the suction temperature which is typically in the high 20 F's to low 30 F's. This causes the vapor pressure at the cooling coil to drop which has almost an immediate effect on the vapor pressure throughout the room (Boyle's Law), which is undesirable when trying to maintain a constant vapor pressure in the space for a given drying process.

On/Off Thermostat Controls Dry Bulb Temperature
Humidstat Adds Moisture to Air and has Cooling Authority
Thermostat and Humidstat, with Humidstat Having Some Authority of Cooling.

High dry bulb temperature causes thermostat to call for cooling, and activates the DX (direct expansion) cooling system. The cooling coil will cool to the predetermined temperature based on suction pressure of the compressor, which is typically 25 F to 32 F. The cooling system will run until the dry bulb temperature is pulled down to a point that satisfies the dry bulb thermostat. During the cooling period, water in the air will be removed as a function of the coil temperature as long as the air's dew point is above the coil temperature. The thermostat is only controlling the dry bulb temperature with no regard to the vapor pressure (dew point) in the space. A condition of low relative humidity in the space will cause the humidstat to activate a humidifier to add moisture into the space. A condition of high relative humidity will cause the humidstat to override the dry bulb thermostat and active the cooling coil to further remove water from the air. During the time when the humidstat has the cooling system activated to reduce the relative humidity in the space, the space may become too cool and the dry bulb thermostat will activate a heating system to re-heat the air, leaving the cooling coil in order to keep the dry bulb temperature within the specific control range.

The addition of heat to the air, causes the relative humidity of the air to fall, which will cause the humidstat to respond by turning off the cooling coil once it sees the target relative humidity reached. Adding heat to the air, cannot change the vapor pressure of the air, it only changes the relative humidity of the air which does not achieve a stable vapor environment.

Modulating Thermostat Controls Dry Bulb Temperature
Humidistat Adds Moisture to Air
Thermostat (Modulated Cooling) and Humidstat as Separate Control Loops.

High dry bulb temperature causes thermostat to call for cooling, and decreases the temperature of cooling system. This is typically done with a modulating valve supplying chilled water to a cooling coil. The cooling coil will cool the air to the dry bulb thermostat's set point, and allow the temperature of the coil to rise as the dry bulb temperature in the space approaches the dry bulb set point. During high dry bulb cooling load conditions, the water in the air will be removed as a function of the coil temperature, as long as the air's dew point is above the coil temperature and the thermostat continues to call for cooling. The thermostat is only controlling the dry bulb temperature with no regard to the vapor pressure (dew point) in the space. A condition of low relative humidity in the space will cause the humidstat to activate a humidifier to add moisture into the space. The amount of water that is added is a function the relative humidity and not the absolute amount of water. Variations in the dry bulb temperature will cause the relative humidity to fluctuate, which will cause the humidstat to respond by adding additional moisture to the air, which will change the vapor pressure in the room.

SUMMARY OF THE INVENTION

In conclusion, maintaining constant vapor pressure in a controlled environment cannot be achieved by conventional methods using dry bulb thermostats and humidstats, where the dry bulb thermostat controls the heating and cooling, and a humidstat compensates for excess removal of water from the air by adding back water by means of a humidifier. Relative humidity, which is what a humidstat controls, is defined by two variables, the dry bulb temperature and vapor pressure (dew point). If either changes, so does the relative humidity. Controlling relative humidity does not provide a means of maintaining constant vapor pressure. Vapor pressure control requires controlling the absolute amount of water in the air.

This invention describes a system and method of control to achieve successful curing and drying of *Cannabis* leaves.

DETAILED DESCRIPTION

Figure 1:
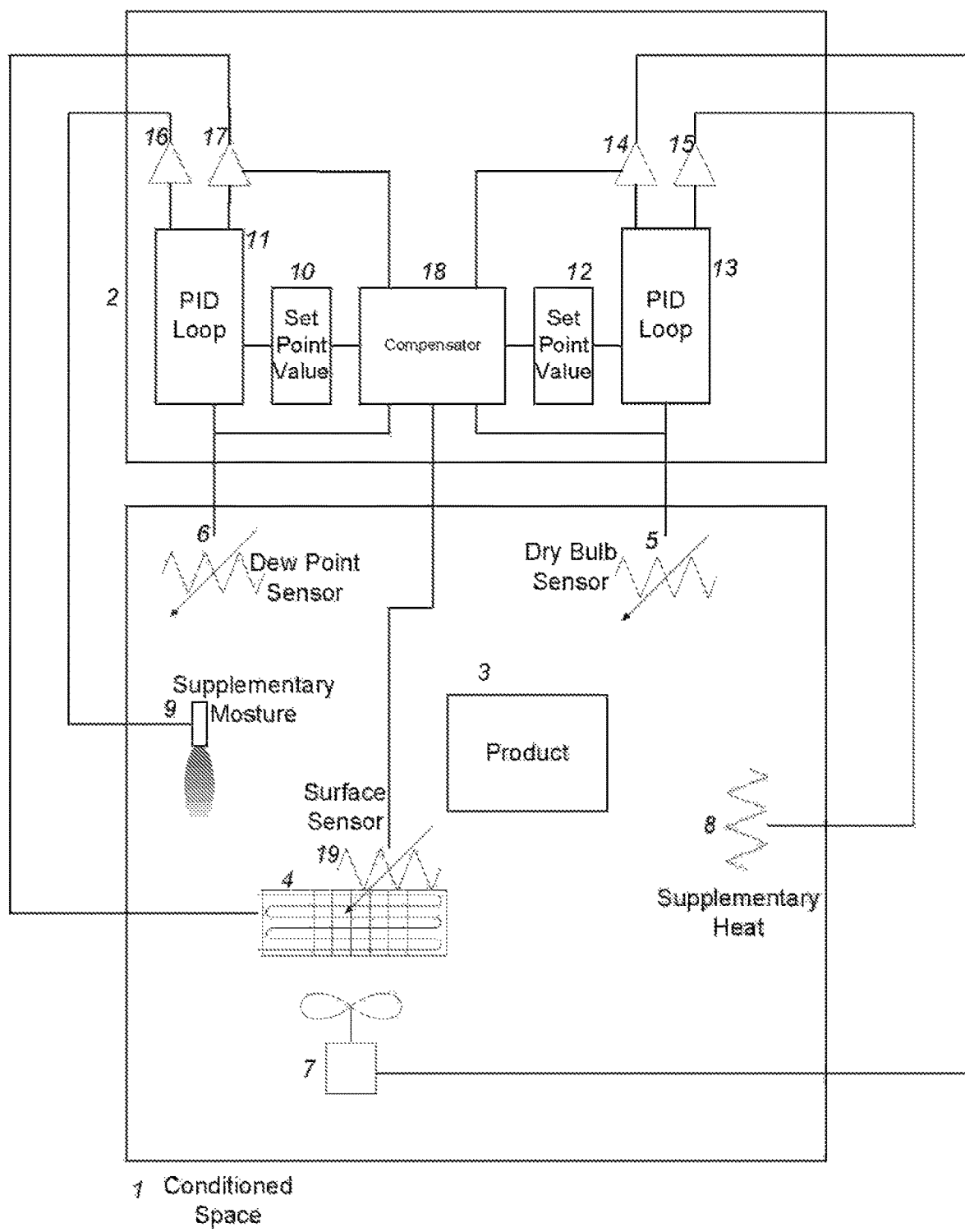
FIG. 1 is a block diagram of a control system of this invention.
Figure 3:
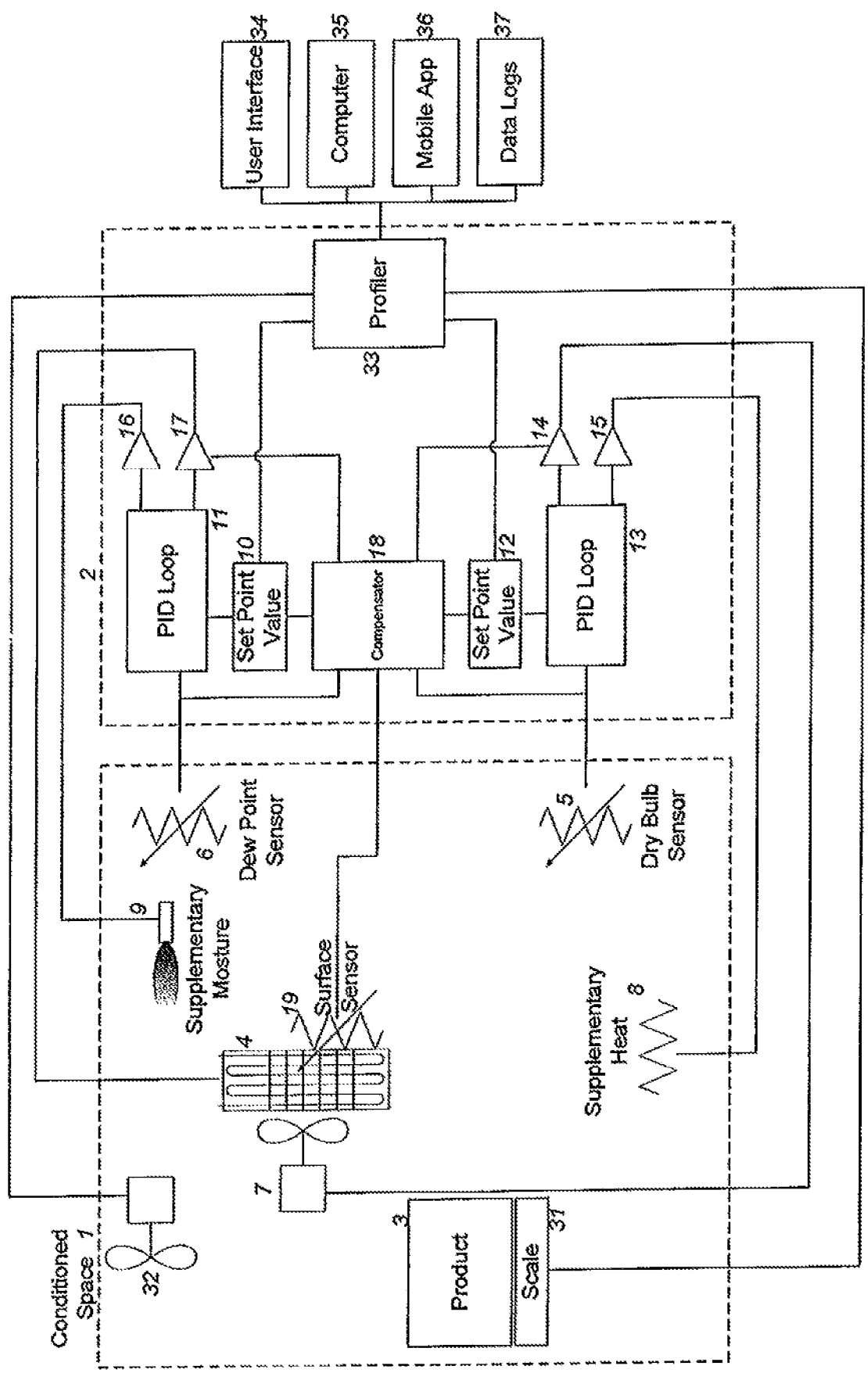
FIG. 3 is a block diagram of a control system of this invention as applied to *Cannabis* flowers with the blocks in FIG. 1 having the same number where appropriate as in FIG. 3.

FIGS. 1 and 3 are system block diagrams and use the same reference numbers where appropriate for using the control system for *Cannabis*.

The controlled and conditioned space or aging room is shown as Conditioned Space 1. Within the Conditioned Space is the Product 3. Also inside the Conditioned Space 1 is a Cooling Coil 4. The Cooling Coil can have, but is not limited to means of cooling by liquids, such as chilled water, or, liquids that are evaporated in the coil, such as refrigerants. The configuration of the cooling coil, can be in the form of pipes with fins, just pipes, or cooled surface areas. When the surface temperature of the Cooling Coil 4, is above the dew point of the air in Conditioned Space 1, the Cooling Coil is limited to removing the sensible heat from the Conditioned Space 1. When the surface temperature of the Cooling Coil 4, is below the dew point of the air in the conditioned space 1, the cooling coil will both remove sensible heat, and latent heat from the conditioned space 1. The act of removing latent heat from the conditioned space 1, causes condensation to form on the cooling coil 4, thereby removing water vapor from the air. Removal of water vapor from the air in the conditioned space 4 reduces the vapor pressure of the conditioned space. The cooling coils sensible and latent capacities are a function of the coil size (heat transfer area), coil temperature and air velocity across the cooling coil's surface. The ratio of sensible and latent heat capacities of the coil can be changed by varying the temperature of the coil and the air velocity across the coil. As the air velocity increases across the coil, the sensible heat capacity goes up when the coil is above the dew point. As the air velocity decreases and the coil is below the dew point in the conditioned space 1, the latent to sensible ratio goes up, increasing the latent cooling capacity, and thereby increasing the amount of water removed from the air.

The control system 2 monitors the dry bulb temperature in the conditioned space 1 with a dry bulb sensor 5. The control system 2 also monitors the dew point in the conditioned space 1 with a dew point sensor 6. The measured values are communicated by the sensors from the conditioned space to the control system 2. The desired dry bulb and dew point conditions are set in the control system 2 via a user interface. With the use of a psychometric chart or equation, and the choice of dry bulb and dew point set points, the user can select the desired relative humidity in the conditioned space 1.

The dry bulb set point is set point value 12, and the dew point set point is set point value 10. There are two independent PID control loops. (PID stands for a feedback loop which has proportional integrative and derivate properties. PID control loops are either hardware, software, algorithms or combinations thereof.)

PID control loop 13 uses the dry bulb sensor 5 value and the dry bulb set point value 12 to calculate an error value. The error value is used to control the flow of air across the cooling coil 4. The air flow across the coil can be controlled by the speed of a fan or the position of a damper that steers the flow of air across the coil. As the dry bulb temperature of the conditioned space 1 increases above the desired dry bulb set point 12, this will create a positive error, and the speed of the air flow will be increased so that the sensible cooling capacity of the cooling coil is increased, thereby increasing the removal of sensible heat from the conditioned space 1. As the dry bulb temperature of the conditioned space 1 decreases and approaches the desired dry bulb set point 12, the speed of the air flow is decreased, so that the sensible cooling capacity of the cooling coil is reduced. If the dry bulb temperature of the conditioned space 1 continues to fall below the desired dry bulb set point 12, this would create a negative error, and a source of supplementary heat 8, located in the conditioned space 1, would be turned on. As the negative error between the desired dry bulb set point 12 and the dry bulb sensor 5 increases, the output to the supplementary heat is increased. The supplementary heat may be controlled in either an On/Off mode, with a temperature differential between on and off, or in a proportional mode where the output of the supplementary heat 8 is variable.

PID control loop 11 uses the dew point sensor 6 value and the dew point set point value 10 to calculate an error value that is used to control the temperature of the coiling coil 4. The temperature of the cooling coil 4 can be changed by controlling the position of a valve that regulates the flow of cooling liquid that is allowed to flow into the cooling coils recirculation loop. Or in an evaporative cooling coil, an adjustable valve is placed on the discharge, or low pressure side of the coil, also referred to as the suction side. Varying the flow capacity of this valve will vary the pressure on the suction side of the evaporator coil, which controls the temperature at which the refrigerant evaporates at, thereby allowing the control of the temperature of the coil.

As the dew point temperature of the conditioned space 1 increases above the desired dew point set point 10, this will create a positive error and the temperature of the cooling coil 4 will be reduced. Reducing the temperature of the cooling coil increases the coil's latent capacity, and thereby removes more water from the air and reduces the dew point in the conditioned space 1. As the dew point temperature of the conditioned space 1 decreases and approaches the desired dew point set point 10, the temperature of the coil is increased, so that the latent cooling capacity of the cooling coil is reduced.

If the dew point temperature of the conditioned space 1 continues to fall below the desired dew point set point 10, this would be a negative error and a source of supplementary moisture 9 located in the conditioned space 1 is turned on. As the negative error between the desired dew point set point 10 and the dew point sensor 6 increases the output to the supplementary moisture 9 is increased. The supplementary moisture 9 may be controlled in either an On/Off mode with a temperature differential between on and off, or in a proportional mode where the output of the supplementary moisture 9 is variable.

While the above control strategy works well when the dew point in the conditioned space 1 causes a positive error, which in turn, causes the cooling coil 4 to be below the dew point in the room, and the dry bulb temperature in the conditioned space 1 to also have a positive error, the dry bulb temperature of the room can be brought down to the desired set point. A problem occurs when the dew point error is at or close to 0, and the cooling coil is no longer being cooled, and there is no need to further reduce the dew point in the conditioned space 1 and, the dry bulb temperature of the room is above the set point, causing a positive dry bulb error. At this point, increasing the flow of air across the cooling coil which has limited or no sensible capacity, caused by the small dew point error value, the conditioned space will remain above the desired dry bulb set point.

By introducing a sensor on the surface of the cooling coil, surface sensor 19, the surface temperature of the cooling coil can now be communicated to the control system 2. When the compensator 18 sees that the value of the dew point sensor 6 and the dew point set point value 10 are relatively close, meaning the control is maintaining the dew point set point, and there is a relatively large positive error between the dry bulb sensor 5 and the dry bulb set point value 12, the control compensator will provide bias to the output signal that is coming out of the dew point PID control loop 11. This will cause the cooling coil 4 to be lower in temperature, thereby increasing the coil's sensible capacity and reducing the conditioned space dry bulb temperature. The surface sensor 19 monitors the temperature of the cooling coil 4 and limits the temperature of the coil just above the desired dew point. This is a user adjustable value that is set as an offset to the dew point set point value 12. This offset would normally be set to a value of zero, which would mean the cooling coil 4 surface temperature is limited to the dew point set point, or positive by a value that will keep the coil surface temperature above the dew point set point value. Since it is a user selectable value, in some cases the user may set this value to a negative value so that the cooling coil can go below the dew point setting 10 if desired. Setting the offset to 0 or a positive value will prevent the coil from having latent capacity, since it is at or above the dew point and the coil can now provide just sensible cooling to reduce the dry bulb temperature in the conditioned space 1. As the dry bulb temperature in the conditioned space 1 as measured by the dry bulb sensor 5, approaches the dry bulb set point value 12, the amount of bias applied to the dew point PID control loop 11 output is reduced. This is where the invention allows an error in the dry bulb control loop to effect the output of the dew point control loop.

Figure 2:
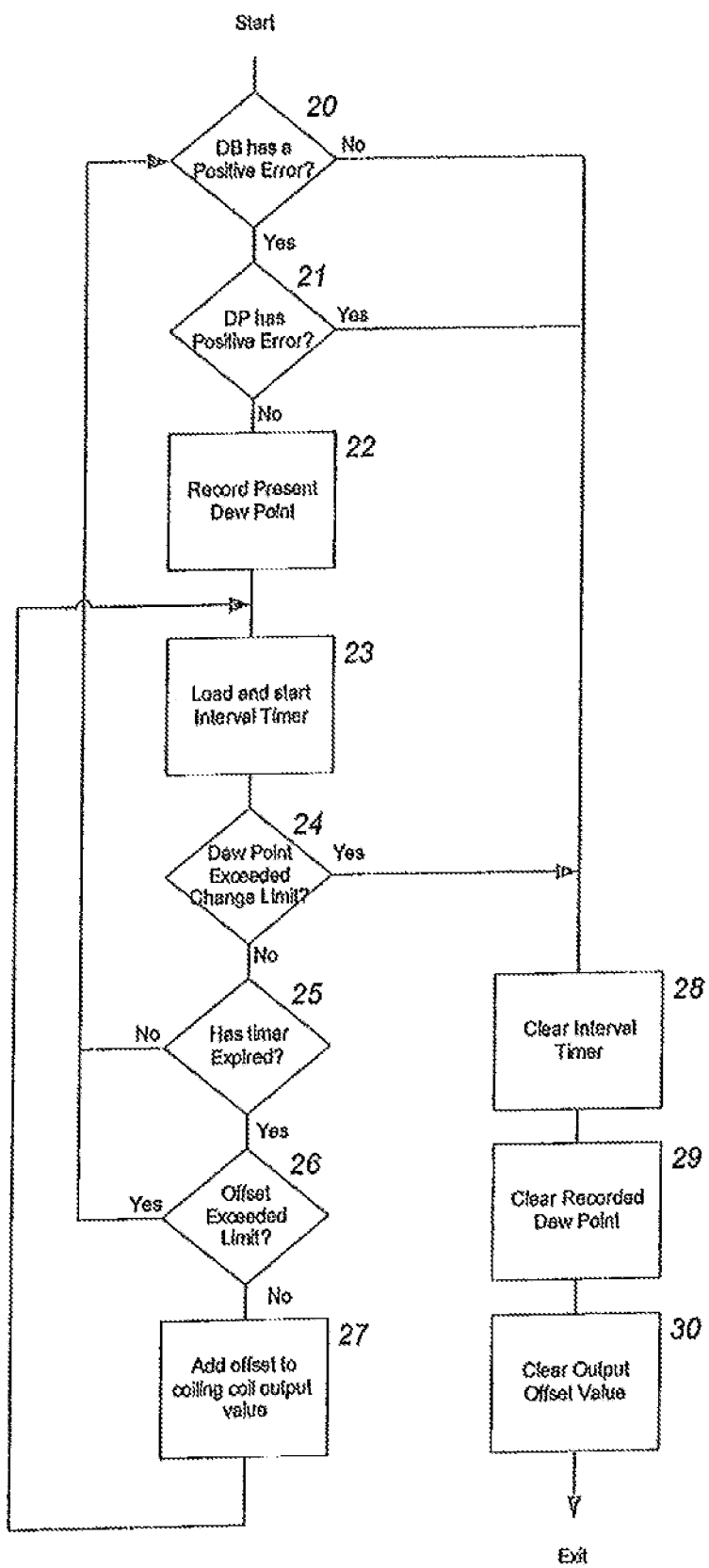
FIG. 2 is a flow chart of an alternative system to deal with certain operating issues, as described.

An alternative method to deal with the condition of a small or no latent load, while there is a sensible load, as outlined above, can also be accomplished without the use of a surface sensor 19. In this method, as shown in FIG. 2, the compensator 18 monitors if there is a positive error between the dry bulb set point 12 and the actual dry bulb as measured by dry bulb sensor 5 in the conditioned space; this decision is shown as block 20. If there is a positive error which indicates a need for sensible cooling, an additional decision as in block 21 is made to determine if there is not a positive error between the dew point set point and the actual dew point in the conditioned space, as sensed by the dew point sensor 6.

Not having a positive error in the Dew Point PID control loop 11, would indicate the latent load is satisfied, and there will be little or no output to the cooling coil 4. At this point in time when these conditions are true, the present Dew Point in the conditioned space is recorded 22 as sensed by the dew point sensor 6 in the conditioned space. The timing is started at 23 with an interval timer, with a user selectable amount of time that is loaded.

This interval timer periodically allows the compensator 18 to add a user selectable amount of offset to the output to the cooling cool 4, thereby reducing the temperature of the coil. Reducing the temperature of the coil 4 increases the coil's sensible capacity, in an effort to reduce the error of the dry bulb temperature of the conditioned space. At step 24 the dew point is monitored in the conditioned space as measured by the dew point sensor 6 and is compared to the value of the dew point in the conditioned space that was recorded at step 22 at the start of this process. If the dew point in the conditioned space has decreased by a user selectable amount, that would indicate the dew point in the conditioned space is starting to drop by an unacceptable amount. At step 24 the process may be aborted, and the interval time 28, the recorded dew point 29 and the output offset value 30 cleared. The interval timer is tested at step 25 to see if additional offset can be added to the output of the cooling coil. This periodic interval of time, allows for the thermal lags in the system to take place over time, as not to add too much cooling to the coil too quickly, causing the coil to get too cold, and thereby drying the conditioned space. There is also a user selectable amount that will limit the amount of offset that can be added to the output to the coil during this process that is tested at step 26. Once the limit is reached, no further offset is added but the output of the coil is left at this level, until dew point limit is exceeded at step 24, or the dry bulb positive error has been eliminated at step 20, at which point the interval timer is cleared at step 28, the recorded dew point is cleared at step 29, and the output offset is set back to 0, at step 30.

The above description applies to cheese and meat. Other systems such as hydroponic growing installations such as for bean sprouts can advantageously use this system. Other food products can also benefit from this system.

The following is a description of the novel system and method of this invention for drying and curing *Cannabis* flowers.

*Cannabis*, like cheese and cured meats, come from different climate regions in the world. The local climate has dictated the attributes that makes the product desirable for consumption. Cheddar cheese originally comes from the English village of Cheddar, while Parmegiano-Reggiano's origin is from the Provinces of Parma. An attempt to produce Cheddar in the Italian countryside, or producing Parmesan in Cheddar would in both cases turn out a very different product due to the local climate conditions which effect the raw milk used, but more importantly effect the product during the time the product goes through the aging process. On the other hand and as described above in the background of the invention, the invention allows cheeses and meats to be produced independent of the locations of local climates since the relevant climatic conditions are beneficially controlled. Thus, desirable end products of *Cannabis* can also be produced independent of the ambient climatic conditions, since the conditions affecting the aging or drying processes can be controlled.

There are two common species of the *Cannabis* plant, *sativa*, and *indica*. *Sativa* tends to be a tall and thin plant with long thin leaves, with its origin from temperate climates in areas such as Southeast Asia, Africa, and North and South America, *indica* tend to be a shorter plant, and more full than the *sativa* plant, with origins in more mountainous climates, such as Afghanistan and Pakistan where the plant is subject to harsher environments.

Once the *Cannabis* plant flowers, and the flowers reach a desired level of maturity, the plant and flowers are harvested. The flowers are removed, and then need to be dried and cured before consumption. The different species of the *Cannabis* flower will have different water content, and require different drying and curing regiments. Like the drying and curing process of cheese and meats, where the time and rate at which the water leaves the product is significant, similar factors apply to the drying and curing of *Cannabis*.

The *Cannabis* flower is where some of the desired compounds are found such as THC, CBD, terpenes and other chemical components. When the flowers are cut from the plant, the water content in the flower will be approximately 75-80%. In order to the make the flower, also known as a bud, desirable for consumption, by means of smoking/burning, the flower must be dried and cured. In the drying phase, the bulk of the water content (moisture) in the flower needs to be reduced to approximately 33% of the starting value from approximately 75-80%. The common method of removing moisture, is to place the picked flowers, either on trays, hung or in open containers to allow the moisture in the flower to evaporate in addition to chlorophyll and other pigments. While this method works to some degree, the rate at which the moisture and other components leaves the flower is subject to either non-existent or poor control of the drying and curing environment, dependent upon where the flowers are placed during the drying and curing process. Following the drying phase, there are also beneficial desirable attributes gained as part of a curing period after the flower is dried to a target moisture content. This phase includes but is not limited to the evaporation of some additional moisture to a level of 10-15% of initial moisture content, development of volatiles, conversion of CBG to THC that are found in the flower, as well as ongoing conversion of chlorophyll to sugars and other compounds found in the flower.

The free available water that is in the flower (also known and measured as Water Activity $a_w$) is removed by placing the flower in an environment where the vapor pressure in that environment is lower than that of the flower. Optimum results are achieved when the rate at which the water leaves the flower is properly controlled. If the water is removed too quickly, the outside of the flower can dry too quickly causing the moisture in the core of the flower to be trapped, which both produces a lower quality finished product, as well as increasing the possibility for the remaining water in the core to grow mold, and other forms of unwanted decay to take place.

The invention as outlined below allows the user to control the rate at which moisture and other compounds are allowed to leave the flower during the drying stage. It also allows the flowers to remain in the controlled environment during the curing phase of the process, which begins once the moisture content reaches a desired level.

The current method of drying and curing is done by first placing the flowers outdoors, or in a room for a period of time, for the drying process to occur. When left outside to dry, the rate of moisture loss is uncontrolled, and is subject to the local environmental conditions and contaminants. When the flowers are placed in an unconditioned room the same issues occur. Producers of the dried flowers have tried to improve the outcome of the drying process by placing the flowers in a room, which might be controlled by standard heating and air-conditioning, and humidification equipment, controlled by standard comfort controls such as a room thermostat and humidistat, which does not provide sufficient control of vapor pressure, and dry bulb temperature during the drying phase of the process to achieve better results. Once the producer feels that it has achieved the optimum moisture level in the flowers, it typically places the flowers in a closed container which begins the curing process. The closed container is typically used to reduce the rate of water loss from the flower during the curing phase of the process. When closed containers are used, they need to be periodically opened to allow unwanted gases and moisture to escape.

FIG. 3 is a block diagram of the control system described with relation to *Cannabis* but is applicable to other products such as food products. The same reference numerals in FIG. 1 are used to designate the same elements in FIG. 3, while elements added are identified by numerals 31-37.

The disclosed invention relating to *Cannabis* provides system 2 and a method of control that regulates the rate at which the moisture leaves the flower (product) during the drying and curing processes, by controlling the Vapor Pressure/Dew Point in control system 2 and air flow in the conditional space drying environment 1. The control allows the user via a user interface 34 connected to the control system 2 to set targets for Vapor Pressure (Dew Point), Dry Bulb temperature and Air Flow rate values and parameters in the conditioned space where the flowers are being dried and cured. The differential vapor pressure between the room and the flower affects the rate of moisture loss from the flower to the room. To the extent the reference numerals for elements in FIG. 1 are the same as in FIG. 3, some of the description relating to FIG. 3 may be repetitive.

Figure 4:
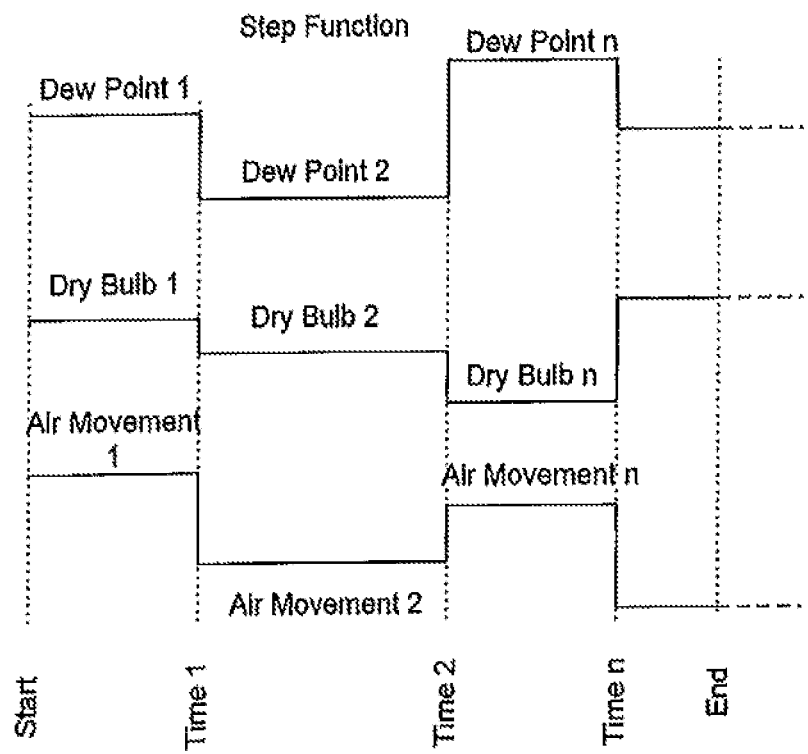
FIGS. 4-9 are flow diagrams showing the relative relationship of the various parameters being controlled.
Figure 5:
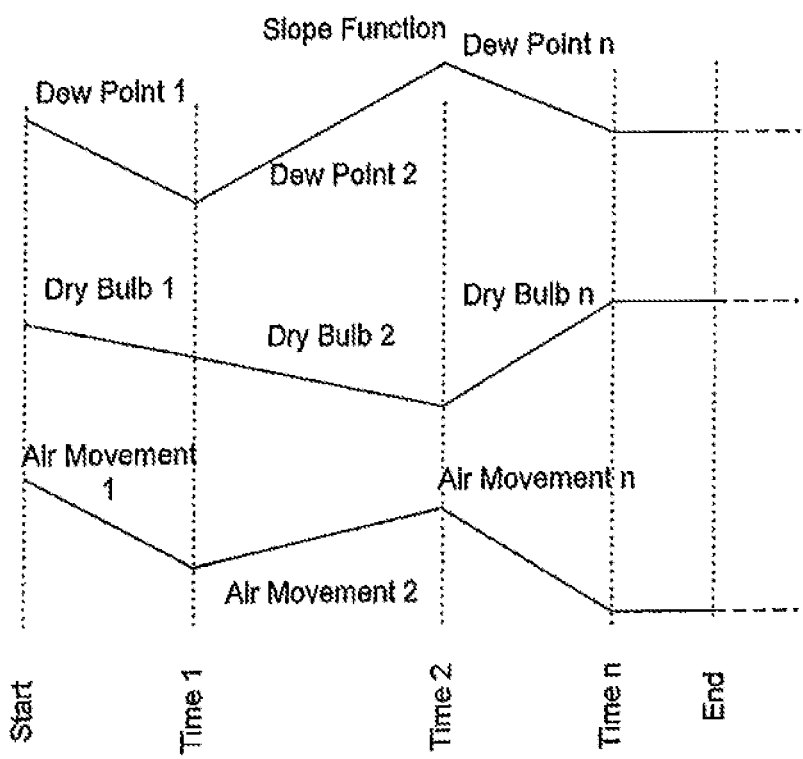
Figure 6:
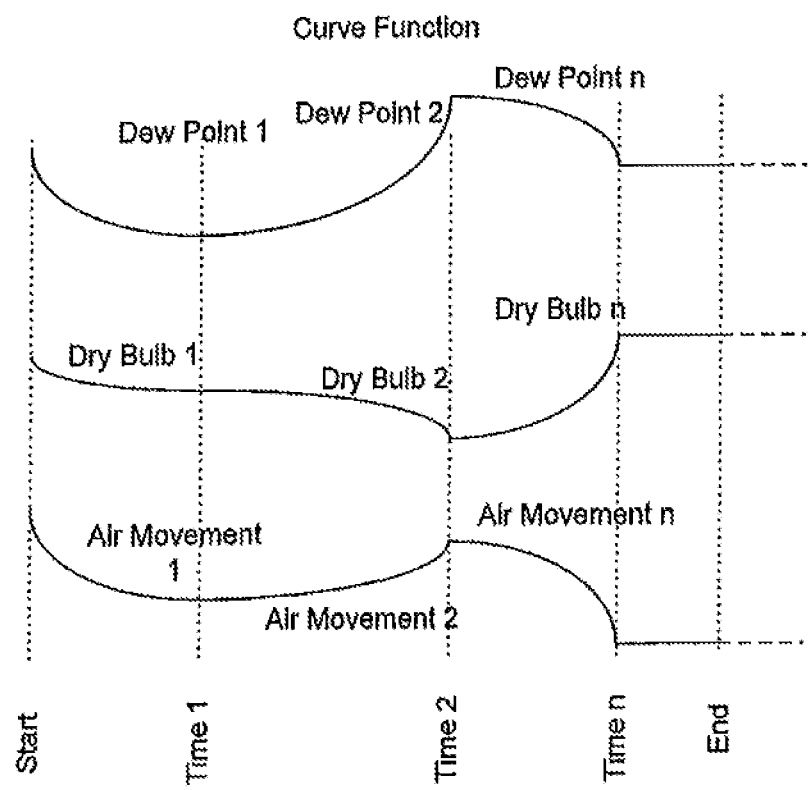
Figure 7:
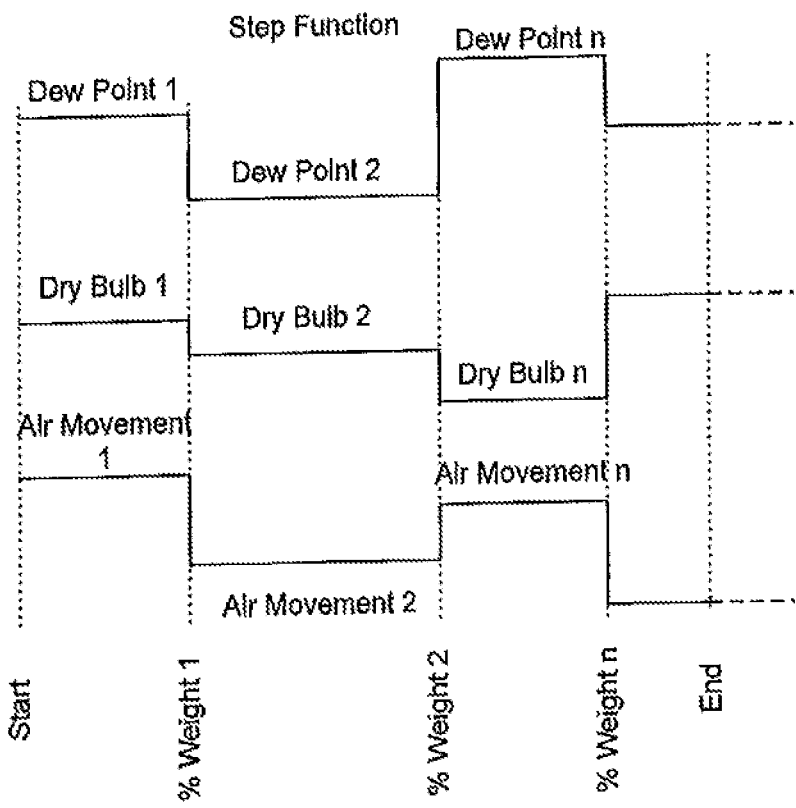
Figure 8:
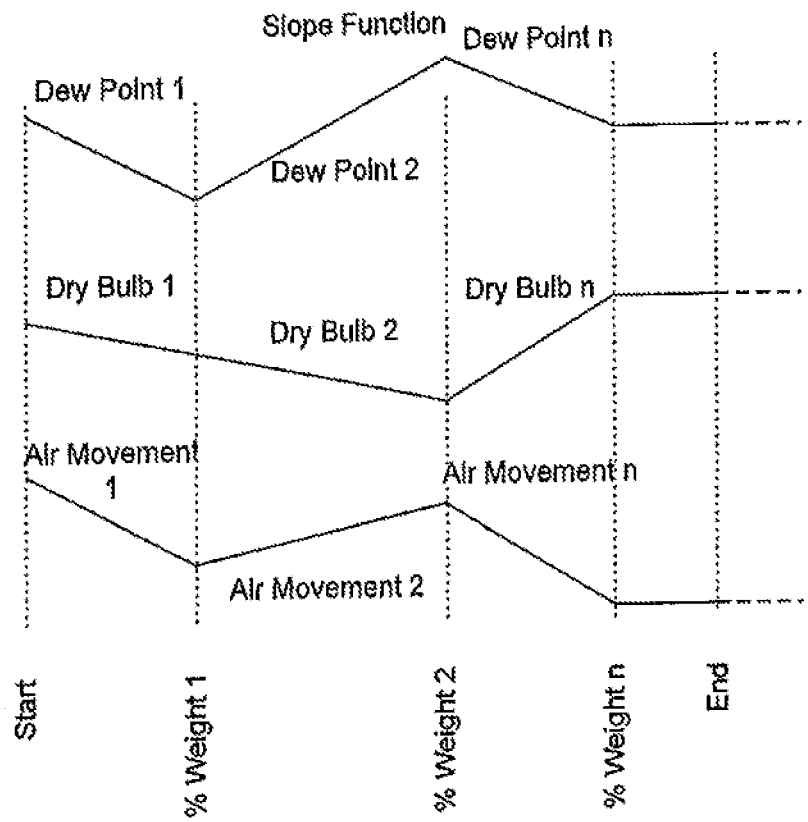

The control allows the user via a user interface 34 to set a schedule of target vapor pressures, dry bulb temperatures and air flow in the conditioned space. The amount of time the flowers remain at the various vapor pressures, dry bulb temperatures and air flows is usually for a period of days and/or weeks, but can also be set for hours. As the flower dries in accordance with the present invention, the vapor pressure, temperature and air flow in the room will be automatically adjusted after a programmed period of time (see FIGS. 6-8) to a new vapor pressure, dry bulb settings and air flow, to meet a desired or target drying rate of the flower. After a programmed period of time the profiler 33, adjusts the dew point 10 and dry bulb 12 set points and air flow rate which will cause the vapor pressure, dry bulb and air flow to adjust to new values that slow the moisture loss rate of the flower so that the curing phase can begin. By reducing the differential vapor pressure, temperature and air flow between the room and the flower, the rate of moisture loss can be slowed, and even stopped during the curing phase. The control allows the user to program vapor pressure (dew point), dry bulb temperature and air flow profiles, over periods of time (FIGS. 4-6). The user has the option to have the set points change as a step (FIG. 4) at the end of a time interval, or slope either as a line (FIG. 5) or curve (FIG. 6) between the starting and ending vapor pressure (dew point), and/or the dry bulb temperature and/or air flow. When the user selects the curve function, they have the ability to alter the path of the curve between the starting and ending points by setting a bias value as referenced to a straight line. The polarity of the bias value will determine if the curve starts shallow or steep, and the value between 0 and 1 will determine the magnitude of the curve from a straight line, with 0 being a straight line, and 1 being what looks like a step with a very steep rise. This allows the user to profile the conditions in the room based on a specific strain, the quality of plant at harvest and other pre drying and curing conditions to best achieve the desired finished product.

The control system also may include a scale function, so that either a representative sample 3 of flowers can be placed on an electronic scale weighing mechanism 31, or the entire contents of the room can be weighed. The control system allows the user to either enter the tare weight of the containers, trays, carts or room, manually if known, or capture the tare weight of the of the containers, trays, carts and/or room, using the weighing mechanism 31 via the user control interface 34. Then, once the flowers are placed in the room for drying, the starting flower weight is captured by the control, via the weighing mechanism. The drying process is then started by bringing the room to a desired starting vapor pressure, dry bulb and air flow set points. The control continuously monitors the product weight, calculates the amount of weight loss, and this is displayed on the user interface 34. This allows the user to monitor and track the rate of moisture loss during the drying and curing process. The percent weight loss is also calculated and displayed.

Figure 9:
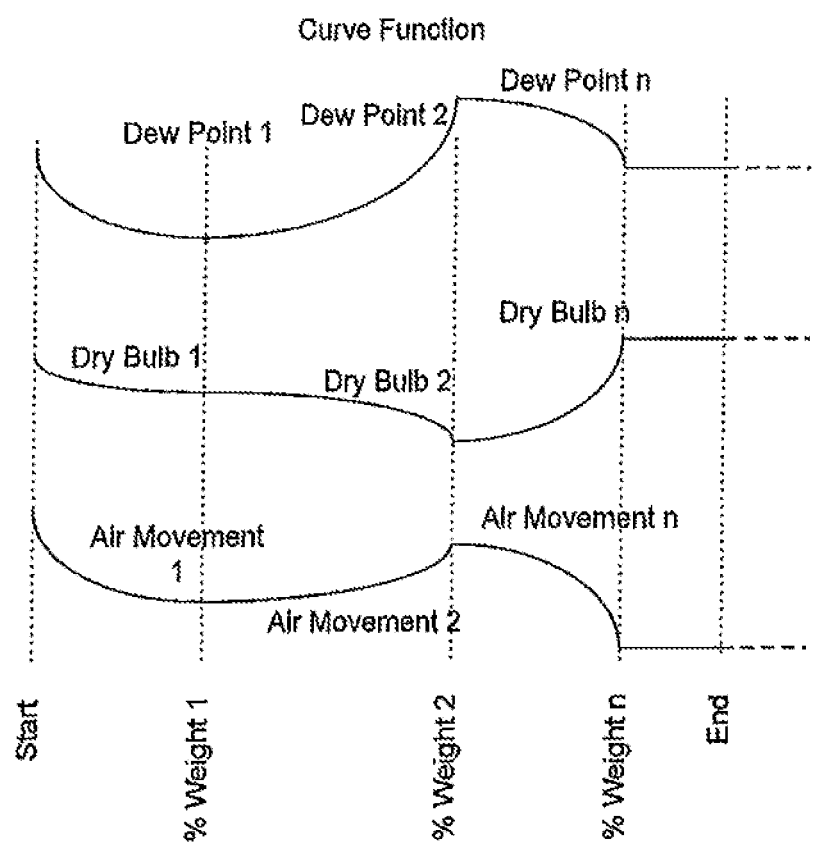

In addition to a time function causing a programmed change in vapor pressure, dry bulb temperature and air flow in the controlled room 1, a user programmed amount of percent weight loss, can cause the control to advance to the next desired vapor pressure, dry bulb temperature and air flow set points, that have been programmed into the drying and curing profiler in either a step (FIG. 7), slope (FIG. 8) or curved fashion (FIG. 9).

The control system maintains a record 37, (log) of the controlled values in the room, while also recording the weight loss of the flower. This provides the user useful information for fine tuning vapor pressure, dry bulb temperature and air flow profile to achieve the best product results.

The monitoring of values, and controlling of set points, in addition to being monitored, programmed and changed at the controls user interface 34, may also be monitored, programmed and changed from a computer 35 via a browser, or, via a mobile App 36 on a hand held device.

The above method and systems described are complete environmental and climate controls for meats, cheese, *Cannabis* and other food products requiring drying and curing.

By controlling the entirety of the environment in an effective fashion as described above, the new and novel system allows controls to be implemented so that processes which can be accelerated can be investigated to compare results according to stored data to be able to increase the effectiveness, desirability, taste and overall quality of the product being dried and cured.

Various conditions in the control system can be changed and preferred combinations can be produced which will result in an end product having the best qualities in the best time being produced anywhere in the world without regard to the ambient environmental local conditions.

Figure 10:
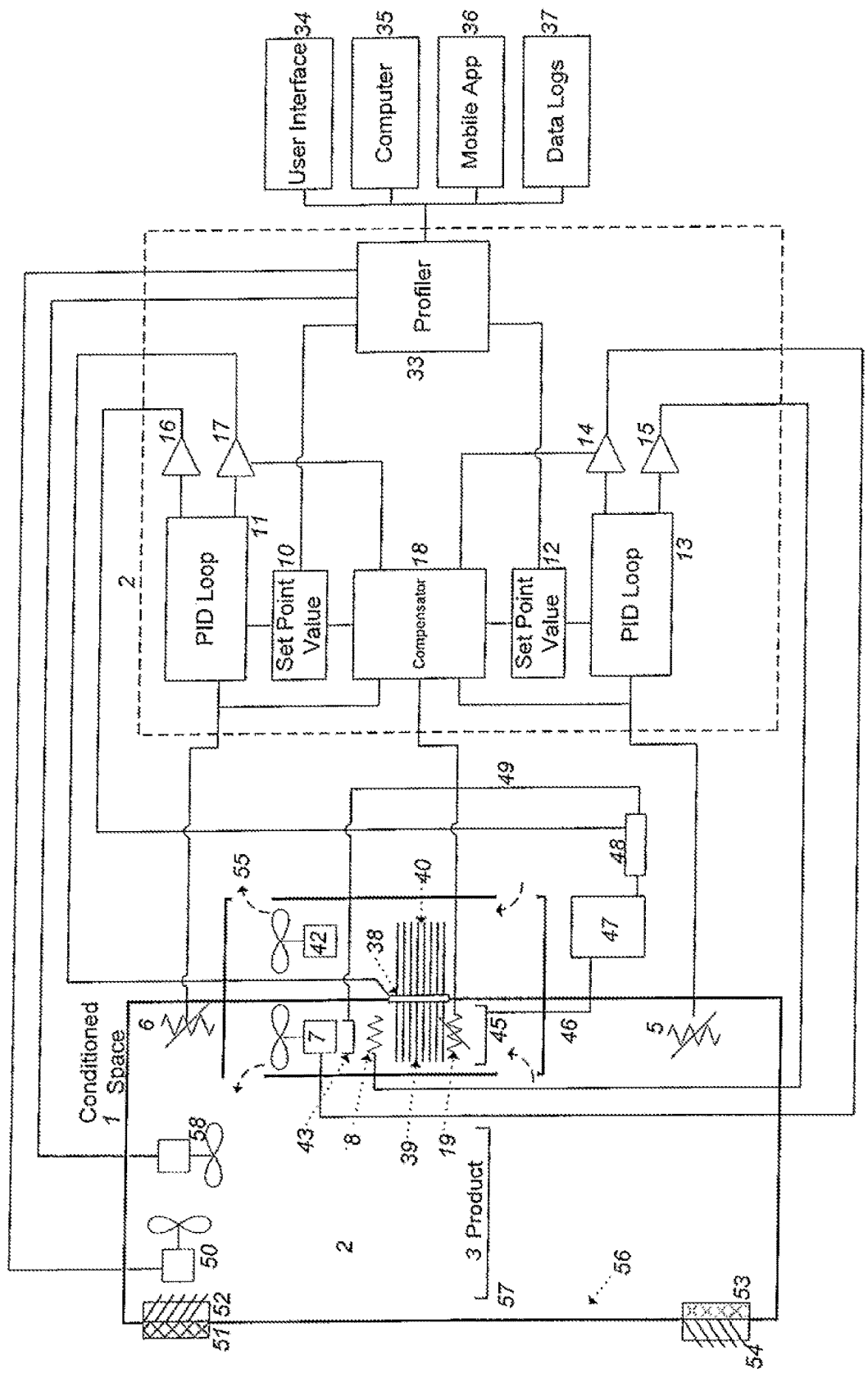
FIG. 10 is a block diagram similar to FIGS. 1 and 3 but using a Thermoelectric Cooler in the system of FIG. 3.

The invention as outlined below and as shown in FIG. 10 uses a Thermoelectric Cooler (TEC) also called a Peltier device as an alternative to other means of cooling, derived from the direct expansion of a refrigerant (DX). Use of a TEC reduces the number of mechanical components, weight and cost as compared to a DX system. The use of a TEC is best suited for small table top drying and curing system that allows the user to control the rate at which moisture and other compounds are allowed to leave the flower during the drying stage. It also allows the flowers to remain in the controlled environment during the curing phase of the process, which begins once the moisture content reaches a desired level.

The disclosed modified system as shown in FIG. 10 provides a method of control, that regulates the rate at which the moisture leaves the flower (product) 3 during the drying and curing processes, by controlling the Vapor Pressure/Dew Point and air flow 58 in the drying environment 1. The flowers referred to as product 3, are placed on drying trays 57, and then placed in the drying cabinet, which is referred to as the conditioned space 1. The control allows the user via a user interface 34 connected to the control to set a desired Vapor Pressure (Dew Point), Dry Bulb temperature and Air Flow rate in the conditioned space 1 where the flowers are being dried and cured. For ease of use there may be included pre-programed sets of values that the user can select from. The differential vapor pressure between the conditioned space 1 and the flower (product) 3, effects the rate of moisture loss from the flower (product) 3 to the conditioned space 1.

A Thermoelectric cooler (TEC) 38 is placed in the wall of an insulated cabinet 56. When a voltage is placed across the terminals of the TEC, one side of the device rises in temperature as the other side falls in temperature. The amount of power applied determines the amount of energy transfer between the two sides of the TEC. Reversing the polarity reverses the flow of heat between the two sides, thereby reversing the hot and cold sides. As the difference between the desired dew point, set point value 10 and the actual dew point as measured by the dew point sensor 6 increases, where the measured dew point is greater then the set point value 10, a voltage proportional to the error will be output from amplifier 17 and fed to the TEC 38. As the error increases, the voltage across the TEC 38 will go up, causing the heat heat sink 39 on the inside of the conditioned space to go down in temperature, and the heat sink 40 on the outside of the conditioned space to go up. As the temperature of the heat heat sink 39 on the inside of the conditioned space 1 goes down, at the point when the surface temperature reaches the dew point of the air in the conditioned space 1, water will start to condense on the heat sink 39. As the beads of water coalesce on the heat sink, they will fall and be collected into a condensate pan 45. The condensed water will then travel through a tube 46 and into a collection reservoir 47. As the water vapor in the conditioned space 1 condenses on the heat sink 39, the vapor pressure in the conditioned space 1 will be reduced and sensed as the measured dew point by the dew point sensor in the space 1. The lowering of the measured dew point in the space will reduce the error between it, and the dew point set point value 10, thereby causing the output error value on the output amplifier 17 to reduce the power being sent to the TEC 38 thereby reducing its cooling capacity, and reducing the amount of water that is condensed. In time, the PID control loop 11 will establish a stable vapor pressure in the conditioned space 1 by maintaining the controlled dew point at the dew point set point value 10. Only when a positive error condition occurs, where the measure dew point in the controlled space 1 is greater then the dew point set point 10 will only a positive voltage be applied to the TEC. If the measured dew point is lower then the set point dew point 10, this would indicate additional moisture needs to be added to the conditioned space 1. This negative condition will cause the PID control Loop 11 to output a signal to amplifier 16 which will control a pump 48, that will pump water, from the condensate collection tank 47 through a tube 49 to a pan 43 where the water will be allowed to evaporate and thereby increase the dew point in the conditioned space 1. Once the measured dew point reaches the value of the dew point set point, the PID control Loop 11 will be satisfied, and the output of amplifier 16 will be 0, so the pump 48 will be off.

When the measured dry bulb temperature in the conditioned space 1 is higher then the set point value 12 of the conditioned space 1, a positive error value will be output from the PID control Loop 13 to the output amplifier 14, which drives the speed of fan 7 that is passing air from the conditioned space 1 over the cooling heat sink 39. The higher the air velocity caused by the fan 7 the greater the sensible cooling capacity will be to drive the temperature of the conditioned space lower. When conditioned space 1 has a lower measured temperature then the set point value 12, a negative error will result in the PID control Loop 13, causing an voltage on the output of amplifier 15, which will cause the heater 8 in the conditioned space to get warm and thereby heat the conditioned space. The output of the heater will be reduced as the sensed temperature approaches the desired set point. During the heating period the air circulation fan 7 in the conditioned space may be modulated by the compensator 18, which can inject an offset into the output amplifier 14, which drives the fan 7 to provide additional air movement if required.

Whenever the TEC 38 is active, a cooling fan 42 runs to remove the heat from the TEC heat sink 40, to the ambient air 55 outside the insulated cabinet 56.

By controlling the cold temperature of the heat sink 39 as a function of the dew point in the conditioned space 1, the vapor pressure is thereby controlled as a function of the latent capacity of the heat sink 39 as its surface temperature varies. By controlling the rate at which the air moves over the heat sink 39 as a function of the dry bulb in the conditioned space 1, the dry bulb temperature is thereby controlled as a function of the sensible capacity of the heat sink 39.

When the desired vapor pressure as measured by the dew point sensor 6 is at the dew point set point 10, there is no need for additional moisture removal, and the output of amplifier 17 will be at 0, and thereby, the heat sink 39 will be at or near the dry bulb temperature of the the conditioned space 1. If during this condition there is a need for the temperature of the conditioned space 1 to be lower, as measured by the dry bulb sensor 5 in the conditioned space 1 as compared to the dry bulb set point value 12, the fan 7 will be running as a result of this error, but no sensible cooling will be taking place since the heat sink 39 will be at the ambient temperature of the conditioned space. When these conditions occur the compensator 18 will apply a bias to amplifier 17, causing the TEC 38 to cool heat sink 39, thereby increasing the sensible capacity of the heat sink 39. Temperature sensor 19 which is in close communication with heat sink 39 will provide the temperature of the heat sink 39 to the compensator 18 which will control the amount of bias to amplifier 17 to keep the temperature of the heat sink 39 above the dew point of the air in the conditioned space 1 so that condensation will not form on the heat sink 39, thereby keeping the latent capacity of the heat sink 39 at 0, while at the same time providing sensible cooling of the heat sink 39. In this way, the dry bulb temperature of the conditioned space can be lowered without lowering the vapor pressure in the conditioned space 1.

Consistent and correct environmental conditions are critical for proper growth of numerous agricultural products. For example, tomatoes, peppers, strawberries and other fruits and vegetables can all be effectively grown in a controlled environment. Also, most medical and recreational *Cannabis* is grown indoors in grow rooms. Growing in a controlled indoor environment allows the grower to have complete control of the growing conditions such as light, temperature, humidity, irrigation and vapor pressure deficit (VPD), which would be more variable (or uncontrollable) if grown outdoors or in a traditional greenhouse environment. Growing in a contained grow room also helps the grower to keep the plants isolated from unwanted pests and molds. In many cases flower/fruit production is dependent upon subjecting the plants to day/night (photo/non photo) light cycles, which may be accomplished year round in the controlled environment of this invention.

The grower is faced with the challenges of keeping the temperature and humidity levels optimal during the growing and flowering/fruiting phases. The lights that are used to provide the energy to the plants for photosynthesis produce large amounts of heat, which becomes a required sensible cooling load for mechanical cooling equipment in order to keep the plants at the optimum growing temperature. Even with the adoption of LED lights, there still is a large amount of heat generated in the grow room by lights, that needs to be removed by mechanical cooling equipment. While the lights are providing the required energy for photosynthesis to the plants, the plants also require nutrients, which are delivered as a solution in water, which is taken up by the roots, and moved up through the plant, and into the leaves. The plant absorbs the nutrients along the way as required, and the water is then transpired through the leaves. The water that is transpired from the leaves to the room, must then be removed from the air in the grow room when the humidity level in the room goes above the desired range. Also, excess water from the irrigation that is not absorbed by the plants' roots becomes run off, which is collected on the tables and trays, and is left to either evaporate or run to a collection containment/drain. The water that evaporates from the tables, tray and floor must also be removed from the air, when the humidity level in the room goes above the desired range.

Grow rooms are typically conditioned and controlled with commercially available Heating Ventilating, Air-Conditioning (HVAC) systems using typical HVAC temperate and humidity controls. Keeping the dry bulb temperature in an acceptable range is important to the plants health. Conditions where the humidity level of the room is too high, can lead to the development of fungus and attract pests. So the HVAC system must also maintain an acceptable level of humidity in the grow room. Proper temperature and humidity conditions allows for normal healthy plant transpiration.

Many growers are faced with the challenge of having their HVAC system maintain the proper conditions with typical equipment. The sensible load in the grow room is controlled by a thermostat that measures the dry bulb conditions in the room, a humidistat is used to turn on supplementary humidifiers or de-humidifiers as required, to bring the humidity level in the room back to the desired level. Depending on the equipment sizing and conditions in the grow room, a dry bulb thermostat calling for cooling will cause the cooling coils to get cold and then cool the air passing over the coils. This cooling will continue until the dry bulb thermostat is satisfied, and the dry bulb temperature in the room is within acceptable limits. During this period of cooling, depending on the amount of moisture that needs to be removed from the air to meet the required humidity level, which is accomplished by the latent capacity of the cooling coil, the air in the grow room may become to dry, if too much moisture is removed. In this case a humidifier would be required to add moisture back into the room. If not enough moisture is removed during the cooling period, additional moisture must be removed from the air with the use of a de-humidifier or by over-cooling the air, and then reheating the air as it leaves the cooling coil. As the dry bulb temperature in the grow room cycles around the dry bulb control's differential, the relative humidity level will change, even if the moisture content of the air in the room remains constant. This fluctuation in measured % RH can cause the humidistat to 'chase' what looks like a moving target causing unstable moisture levels in the grow room. The cycling of the lights causes a condition that has a direct effect on the sensible load on the room, as well as changing the transpiration rate of the plants, effecting the humidity level in the room. This change in conditions must be properly responded to by the HVAC equipment and controls to maintain a correct environment for the plants.

The lights are typically turned on and off with the use of a time clock, and are cycled 12 hours on, and 12 hours off creating photo and non-photo periods. When the lights are turned off, the sensible load created by the lights suddenly goes to 0, and the dry bulb thermostat controlling the temperature in the grow room responds by no longer calling for the cooling system to run, as there is no longer a large sensible load generated by the lights. With the cooling coils no longer providing both sensible and latent cooling, it is then up to, if installed, the de-humidifiers to remove any excess moisture in the air, in order to bring the grow room back to the desired % RH, or have the cooling coils continue to cool the air to remove the excess moisture, and then reheat the air as it leaves the air handler. There is a transitional period when the lights have just been turned off, and plants have not yet responded to the loss of light which stops photosynthesis and transpiration processes, and the water vapor continues to move out the stomata and collects as condensation on the bottom of the leaves which can create an unwanted condition if the water is not adequately removed by evaporation. This evaporative condition is referred to as Vapor Pressure Deficit (VPD). VPD is the saturated vapor pressure at the surface of the leaf as compared to the vapor pressure in the room.

The disclosed invention provides a method of control of the dry bulb temperature and vapor pressure in the grow room. In addition to controlling the desired dry bulb and humidity in the grow room, the invention also controls the lighting and the irrigation in the room, coordinating the various systems that effect the plants' response, and the conditions created by the plants response. By controlling the dry bulb and vapor pressure in the room as two independent variables during the plants' photo/non photo cycles, the desired relative humidity can be consistently achieved.

Figure 11:
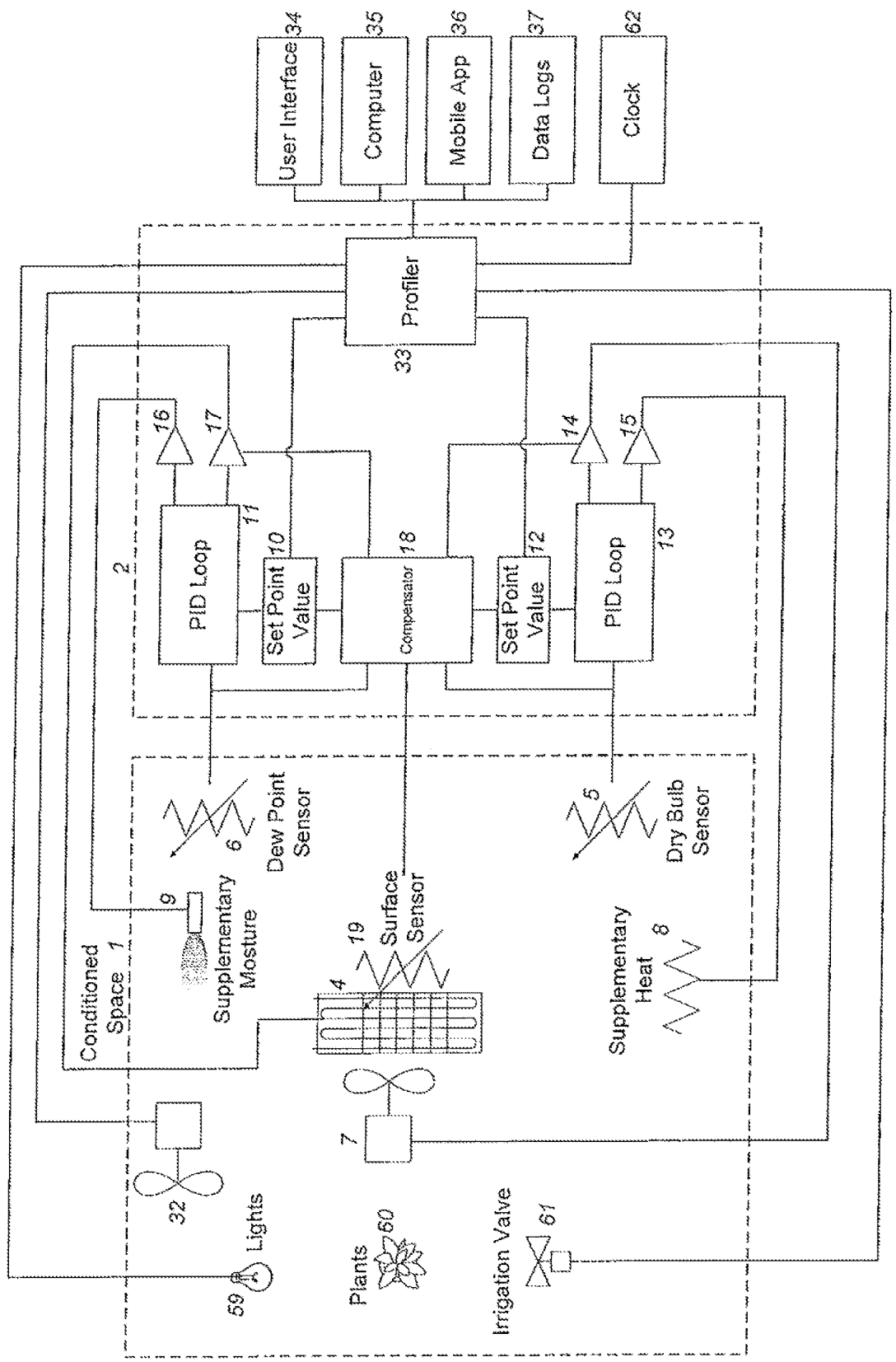
FIG. 11 is a block diagram similar to FIGS. 1, 3 and 10 and uses the same reference numerals, where appropriate and adds lighting controls.

FIG. 11 is a block diagram for a conditioned space 1 which is the grow room with automated and controlled lighting. The numerals in FIG. 11 are the same as those in FIGS. 1, 3 and 10 for the same components. The grow room 1 contains the Plants 60, Lights 59, an irrigation valve controls the flow of water and nutrients to the plants 61, a fan used to move air throughout the grow room 1, a temperature controlled cooling coil, that is cooled either by direct expansion of a refrigerant or a chilled fluid 4, a variable speed fan that moves air across the cooling coil 7, sensors that measure the dry bulb temperature and dew point temperature, source of heat 8, and moisture 9, temperature sensor 19 in close communication with the cooling coil 4.

Further referring to FIG. 11, when the grow room is used for the purpose of flowering *Cannabis* plants, the lights are turned on and off in 12 hour intervals or any other desired interval. When the lights are turned off, the sensible load in the room drops suddenly, and typical HVAC systems will require large amounts of reheat, as not to over cool the air in the grow room. By controlling the vapor pressure/dew point in the room independent of the dry bulb temperature in the room, when the lights 59 are turned off, the dry bulb sensor 5 will sense the loss of the sensible load of the lights, by measuring a drop in the measured dry bulb temperature in the grow room 1. This drop in temperature in the room 1 will cause the error between the dry bulb set point value 12 and the measured value by the dry bulb sensor 5, which will cause the output positive output error from the PID control loop 13 to reduce the output of amplifier 14, will reduce the speed of the fan 7, that is moving air over the cooling coil 4. The reduction of air movement over the cooling coil 4 will reduce the sensible cooling of the coil, and increase the latent cooling of the coil. With this change in the coil's 4 sensible to latent ratio, the room conditions are better maintained when there is a transition from light to dark, during the period when the plants are still in a high rate of transpiration, which requires a high level of moisture removal from the air, while the sensible load has been greatly reduced. Should the condition occur that during a high latent load, and small sensible load when the fan 7 is off, and the cooling coil starts to over cool the growing room 1 by means of convective cooling, a negative error will occur on the PID control loop 13, when the dry bulb sensor 5 is measuring a value that is below the dry bulb set point 12. This negative error will cause a value on the output of amplifier 15, which will drive the supplementary heat 8 in the growing space. Unlike conventional HVAC systems where the supplementary heat is placed, with regard to the air stream, after the cooling coil, in this system the supplementary heat 8 is placed in the growing room 1 and uses convection, that might be assisted by fan 32 which is used to provide air movement across the plants 60. This method greatly reduces the amount of heat required as compared to conventional HVAC systems since this system is able to reduce the sensible capacity of the coil while raising the latent capacity of the coil which reduces the amount of over cooling in the room during the conditions caused by the switching of the lights 59 from on to off.

In addition to controlling and maintaining the dry bulb and dew point temperatures in the grow room 1. The system includes a clock 62 that is used to turn the lights 59 on and off, or, by way of a dimmer; the light level will be raised and lowered over a period of time at the programmed switch intervals. The profiler 33 will contain the photo and non-photo set points, for both the dry bulb and dew point set points. When it is time to transition from photo to non-photo or non-photo to photo, the profiler will either ramp, or switch the dry bulb set value 12 and the dew point set point value 10 at which the grow room 1 will be maintained. By having the ability to control the dry bulb set point 12, dew point set point, light level of the lamps 59, and irrigation 61. In this way, the conditions in the grow room 1 can be transitioned in a way that is more natural for a plant 60, a method that more closely simulates the transition of temperature, dew point, and light in normal outdoor transitions of the rising and setting sun.

Figure 12:
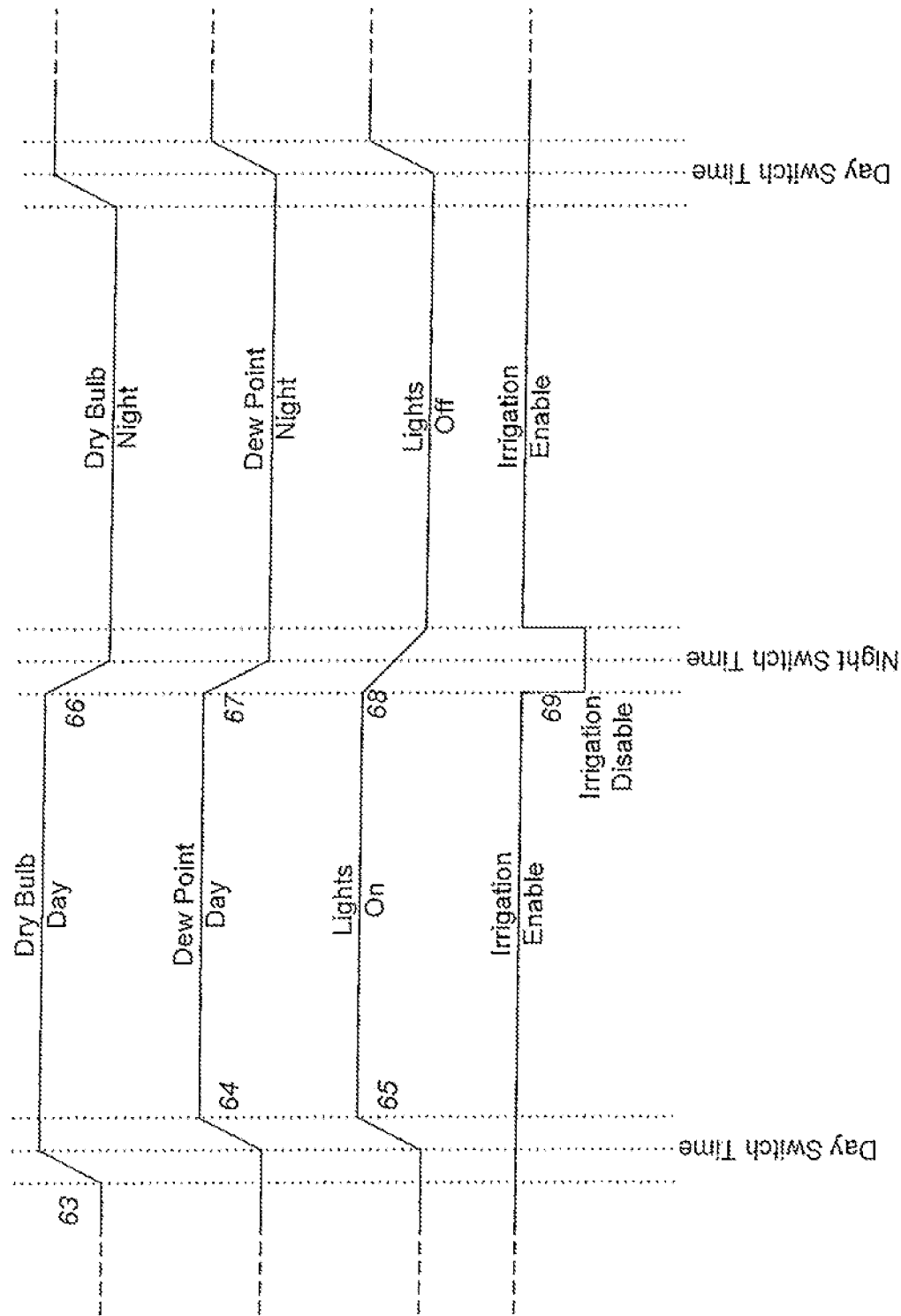
FIG. 12 is a flow diagram of the various parameters being controlled in the block diagram of FIG. 11.

The example in FIG. 12 shows how the dry bulb set point may be transitioned 63 from the prior non-photo set point to the photo set point, prior to the Photo Switch Time. The dew point set point may be transitioned 64 from non-photo to photo, starting at the Photo Switch Time, which is synchronized with the increase in light intensity 65. The amount of time prior to the time of Photo Switch Point, and after the time of Photo Switch Point, that the transition happens over, is programmed by the user, but not limited to, via the user interface 34, a computer 35, a mobile app 36. The irrigation 61 system is also controlled, so that the amount of water going to the plants can be reduced during the transition to better match the reduced rate of water consumption by the plants 60, as they transition from a photo to non-photo mode, reducing water waste and overflow.

It should be understood that the described systems provide good illustrations of the principles of the invention and its practical application to thereby enable one of ordinary skill in the art to utilize the invention with various modifications as are suited to the particular use contemplated. All such modifications and variations are within the scope of the invention as determined by the appended claims when interpreted in accordance with the breadth to which they are fairly legally and equitably entitled.

What is claimed:

1. A system for controlling the drying of a product, said product having a specific vapor pressure, said product located within a conditioned space, said system comprising:
   a first sensor to determine the temperature in said conditioned space,
   a second sensor to determine the vapor pressure in said conditioned space, and
   a controller responsive to the vapor pressure or dew point in said conditioned space with respect to the vapor pressure of the product to control the drying of said product, wherein said controller comprises two independent PID control loops, one of said two PID control loops controls the temperature in said conditioned space to maintain a user-provided setpoint provided by a user and the other of said two PID control loops controls said vapor pressure or dew point of said conditioned space to maintain a user-provided setpoint provided by the user, wherein said controller removes water vapor from said conditioned space to relieve the vapor pressure of said conditioned space, wherein said controller controls the amount and rate water is removed from said conditioned space and said product, wherein said system comprises cooling coils in contact with air in said conditioned space, and wherein said controller controls the temperature of said cooling coils responsive to the vapor pressure to remove water from said conditioned space.

2. The system according to claim 1, wherein said first sensor determines the temperature in said conditioned space.

3. The system according to claim 1, wherein said controller controls the relationship between the vapor pressure of said product and the conditioned space vapor pressure.

4. The system according to claim 1, wherein the controller controlling the temperature in said conditioned space controls a fan to control airflow over the cooling coils as a function of the temperature in said conditioned space.

5. The system according to claim 1, wherein said system monitors temperature and dew point in said conditioned space, wherein the temperature in said conditioned space is monitored by a dry bulb sensor and said dew point is monitored with a sensor to provide a dew point value.

6. The system according to claim 1, further comprising a surface sensor located on said cooling coil, said surface sensor monitoring the temperature of said cooling coil.

7. The system according to claim 1, wherein an error signal in said dry bulb control loop is connected to affect said dew point control loop.

8. The system according to claim 1, wherein said conditioned space comprises cooling coils, wherein said system is responsive to a condition of small latent load while there is a sensible load, said system controlling the temperature of said cooling coils.

9. The system according to claim 3, wherein said system setting target drying rates for said product and controlling the conditions in said conditioned space to meet said target drying rate.

10. The system according to claim 9, wherein said system comprises setting targets for vapor pressure, dry bulb temperature and air flow parameters in the conditioned space, said system responsive to differentials between said targets and the vapor pressure, dry bulb temperature and air flow parameters in said conditioned space to control vapor pressure, dry bulb temperature and air flow parameters to change said parameter to approach said targets.

11. The system according to claim 9, wherein said system sets time intervals for altering the rate of water loss in said product.

12. The system according to claim 9, wherein said system comprises a scale to measure the weight of the product to be dried by said system.

13. The system according to claim 9, wherein said system continuously monitors the product weight and determines the amount of weight loss, said system storing the rate of said weight loss for the product then being dried in said conditioned space.

14. The system according to claim 10, wherein said system creates a log of the controlled parameters in the conditioned space, said log and said control system being electronically accessible either directly by a user or remotely through wireless communication.

15. The system according to claim 1, wherein said conditioned space includes a thermoelectric cooler, the operation of said thermoelectric cooler being responsive to the dew point in said conditioned space.

16. The system according to claim 1, wherein said product is *Cannabis*.

17. The system according to claim 1, further comprising a surface sensor that monitors the temperature of said cooling coil.

* * * * *